United States Patent
Noda et al.

(10) Patent No.: US 7,130,925 B2
(45) Date of Patent: Oct. 31, 2006

(54) INFORMATION PROCESSING APPARATUS AND METHOD FOR RECEIVING/TRANSMITTING DATA BETWEEN AN IEEE802-BASED FORMAT AND AN IEEE1394-BASED FORMAT

(75) Inventors: Takuro Noda, Tokyo (JP); Makoto Sato, Tokyo (JP); Yukihiko Aoki, Tokyo (JP)

(73) Assignee: Sony Corporation (JP)

(*) Notice: Subject to any disclaimer, the term of this patent is extended or adjusted under 35 U.S.C. 154(b) by 659 days.

(21) Appl. No.: 10/189,070

(22) Filed: Jul. 2, 2002

(65) Prior Publication Data
US 2003/0007505 A1    Jan. 9, 2003

(30) Foreign Application Priority Data
Jul. 4, 2001    (JP) ............................ P2001-203538

(51) Int. Cl.
*G06F 15/16* (2006.01)
*G06F 13/36* (2006.01)
*H04L 12/28* (2006.01)

(52) U.S. Cl. ............... 709/249; 709/227; 709/230; 710/306; 710/315; 370/401; 370/395.5

(58) Field of Classification Search ........... 709/227, 709/249, 230, 232; 710/306, 313, 315; 370/401, 370/402, 395.5
See application file for complete search history.

(56) References Cited

U.S. PATENT DOCUMENTS

| 6,185,607 | B1 * | 2/2001 | Lo et al. ............... 709/213 |
| 6,219,697 | B1 * | 4/2001 | Lawande et al. ........... 709/221 |
| 6,266,729 | B1 * | 7/2001 | Leung et al. ............... 710/313 |
| 6,324,178 | B1 * | 11/2001 | Lo et al. ............... 370/392 |
| 6,370,603 | B1 * | 4/2002 | Silverman et al. ............ 710/72 |
| 6,505,255 | B1 * | 1/2003 | Akatsu et al. ............... 709/239 |
| 6,522,654 | B1 * | 2/2003 | Small ............... 370/400 |
| 6,657,999 | B1 | 12/2003 | Brewer |
| 6,751,221 | B1 | 6/2004 | Saito et al. |
| 6,813,651 | B1 * | 11/2004 | Smith et al. ............... 710/20 |
| 6,977,939 | B1 * | 12/2005 | Joy et al. ............... 370/401 |
| 2002/0141418 | A1 * | 10/2002 | Ben-Dor et al. ............ 370/398 |
| 2002/0152346 | A1 * | 10/2002 | Stone et al. ............... 710/305 |

FOREIGN PATENT DOCUMENTS

| JP | 2000-036840 | 2/2000 |
| WO | WO-00/76131 A1 | 12/2000 |

* cited by examiner

*Primary Examiner*—Gregory G. Todd
(74) *Attorney, Agent, or Firm*—Lerner, David, Littenberg, Krumholz & Mentlik, LLP

(57) ABSTRACT

An UPnP control point is connected to an IEEE802 network, and 1394 equipment is connected to an IEEE1394 network. The IEEE802 network and the IEEE1394 network are connected to each other through an UPnP device functioning as a bridge. The UPnP device receives from a general bus input plug a packet transmitted from the UPnP control point, converts it to a format of the IEEE1394 network, and transmits it from an output plug through the IEEE1394 network to the 1394 equipment. The UPnP device stores the association relationship of the plugs.

4 Claims, 23 Drawing Sheets

FIG. 8

```
<s:Envelope xmlns:s="http://schemas.xmlsoap.org/soap/envelope/"
    s:encodingStyle="http://schemas.xmlsoap.org/soap/encoding/">
  <s:Header>
    <t:Transaction xmls:t="some-URI" s:mustUnderstand="1">
      5
    </t:Transaction>
  </s:Header>
  <s:Body>
    <u:asyncReqSend xmlns:u="urn:sony-corp:service:1394NodeService:1">
      <nuid>0800460000000000</nuid>
      <command>000001400000ffff0000404</command>
    <u:asyncReqSend>
  </s:Body>
</s:Envelope>
```

FIG. 11

```
<s:Envelope xmlns:s="http://schemas.xmlsoap.org/soap/envelope/"
    s:encodingStyle="http://schemas.xmlsoap.org/soap/encoding/">
  <s:Header>
    <t:Transaction xmls:t="some-URI" s:mustUnderstand="1">
      5
    </t:Transaction>
  </s:Header>
  <s:Body>
    <u:asyncReqSend xmlns:u="urn:sony-corp:service:1394NodeService:1">
      <response>00000160000000000000000031333934</response>
    <u:asyncReqSend>
  </s:Body>
</s:Envelope>
```

*FIG. 12*

```
<s:Envelope xmlns:s="http://schemas.xmlsoap.org/soap/envelope/"
    s:encodingStyle="http://schemas.xmlsoap.org/soap/encoding/">
    <s:Header>
        <t:Transaction xmls:t="some-URI" s:mustUnderstand="1">
            5
        </t:Transaction>
    </s:Header>
    <s:Body>
        <u:getStream xmlns:u="urn:sony-corp:service:1394ProxyService:1">
            <protocol>rtsp</protocol>
            <uri>sample.ra</uri>
        <u:getStream>
    </s:Body>
</s:Envelope>
```

FIG. 13

|  | GENERAL BUS INPUT PLUG | INPUT | FORMAT |
|---|---|---|---|
| PLUG 1 | 40 | ○ | MPEG |
| PLUG 2 |  | × |  |
| PLUG 3 |  | × |  |
| PLUG 4 | 41 | ○ | AUDIO |

FIG. 15

| | msb | | | | | | lsb |
|---|---|---|---|---|---|---|---|
| OPCODE | \multicolumn{7}{c|}{INPUT PLUG SIGNAL FORMAT ($19_{16}$)} |
| OPERATION [0] | \multicolumn{7}{c|}{PLUG} |
| OPERATION [1] | | | | | | | |
| ⋮ | \multicolumn{7}{c|}{$FF_{16}$} |
| OPERATION [4] | | | | | | | |

FIG. 16

|  | msb | | | | | | | lsb |
|---|---|---|---|---|---|---|---|---|
| OPCODE | INPUT PLUG SIGNAL FORMAT (19₁₆) ||||||||
| OPERATION [ 0 ] | PLUG ||||||||
| OPERATION [ 1 ] | 2 ||| fmt |||||
| OPERATION [ 2 ] | (MOST SIGNIFICANT BYTE) ||||||||
| OPERATION [ 3 ] | tdf ||||||||
| OPERATION [ 4 ] | (LEAST SIGNIFICANT BYTE) ||||||||

FIG. 18

```xml
<?xml version="1.0?">
<scpd xmlns="urn:schemas-upnp-org:service-1-0">
    <specVersion><major>1</major><minor>0</minor></specVersion>
    <actionList>
        <action><name>busReset</name></action>
        <action>
            <name>getNodeNum</name>
            <argumentList><argument>
                <name>nodeNum</name><direction>out</direction><retval/>
                <relatedStateVariable>nodeNum</relatedStateVariable>
            </argument></argumentList>
        </action>
        <action>
            <name>getIrmId</name>
            <argumentList><argument>
                <name>nuid</name><direction>out</direction><retval/>
                <relatedStateVariable>nuid</relatedStateVariable>
            </argument></argumentList>
        </action>
        <action>
            <name>getBmId</name>
            <argumentList><argument>
                <name>nuid</name><direction>out</direction><retval/>
                <relatedStateVariable>nuid</relatedStateVariable>
            </argument></argumentList>
        </action>
        <action>
            <name>getGapCount</name>
            <argumentList><argument>
                <name>gapCount</name><direction>out</direction><retval/>
                <relatedStateVariable>gapCount</relatedStateVariable>
            </argument></argumentList>
        </action>
        <action>
            <name>getSelfIdPacket</name>
            <argumentList><argument>
                <name>SelfIdPacket</name><direction>out</direction><retval/>
                <relatedStateVariable>SelfIdPacket</relatedStateVariable>
            </argument></argumentList>
        </action>
```

FIG. 19

```
<action>
    <name>getStream</name>
    <argumentList><argument>
        <name>protocol</name><direction>in</direction><retval/>
        <relatedStateVariable>protocol</relatedStateVariable>
    </argument></argumentList>
    <argumentList><argument>
        <name>uri</name><direction>in</direction><retval/>
        <relatedStateVariable>uri</relatedStateVariable>
    </argument></argumentList>
</action>
</actionList>
<serviceStateTable>
    <stateVariable sendEvents="yes">
        <name>nodeNum</name><dataType>i1</dataType>
    </stateVariable>
    <stateVariable sendEvents="no">
        <name>nuid</name><dataType>bin.hex</dataType>
    </stateVariable>
    <stateVariable sendEvents="no">
        <name>gapCount</name><dataType>bin.hex</dataType>
    </stateVariable>
    <stateVariable sendEvents="no">
        <name>selfIdPacket</name><dataType>bin.hex</dataType>
    </stateVariable>
    <stateVariable sendEvents="no">
        <name>protocol</name><dataType>string</dataType>
    </stateVariable>
    <stateVariable sendEvents="no">
        <name>uri</name><dataType>string</dataType>
    </stateVariable>
</serviceStateTable>
</scpd>
```

FIG. 20

```xml
<?xml version="1.0?">
<scpd xmlns="urn:schemas-upnp-org:service-1-0">
    <specVersion xmlns=""><major>1</major><minor>0</minor></specVersion>
    <actionList xmlns="">
        <action>
            <name>asyncReqSend</name>
            <argumentList>
                <argument>
                    <name>nuid</name><direction>in</direction>
                    <relatedStateVariable>nuid</relatedStateVariable>
                </argument>
                <argument>
                    <name>asyncRequest</name><direction>in</direction>
                    <relatedStateVariable>asyncRequest</relatedStateVariable>
                </argument>
                <argument>
                    <name>asyncResponse</name><direction>out</direction><retval/>
                    <relatedStateVariable>asyncResponse</relatedStateVariable>
                </argument>
            </argumentList>
        </action>
        <action>
            <name>avcCommandSend</name>
            <argumentList>
                <argument>
                    <name>nuid</name><direction>in</direction>
                    <relatedStateVariable>nuid</relatedStateVariable>
                </argument>
                <argument>
                    <name>avcCommand</name><direction>in</direction>
                    <relatedStateVariable>avcCommand</relatedStateVariable>
```

FIG. 21

```
        </argument>
        <argument>
            <name>resume</name><direction>in</direction>
            <relatedStateVariable>resume</relatedStateVariable>
        </argument>
        <argument>
            <name>inlineNuidPosition</name><direction>in</direction>
            <relatedStateVariable>inlineNuidPosition</relatedStateVariable>
        </argument>
        <argument>
            <name>inlineNuid</name><direction>in</direction>
            <relatedStateVariable>inlineNuid</relatedStateVariable>
        </argument>
        <argument>
            <name>avcResponse</name><direction>out</direction><retval/>
            <relatedStateVariable>avcResponse</relatedStateVariable>
        </argument>
    </argumentList>
</action>
```

FIG. 22

```xml
<action>
    <name>phyPacketSend</name>
    <argumentList>
        <argument>
            <name>phyPacket</name><direction>in</direction>
            <relatedStateVariable>phyPacket</relatedStateVariable>
        </argument>
        <argument>
            <name>phyPacketResp</name><direction>out</direction><retval/>
            <relatedStateVariable>phyPacket</relatedStateVariable>
        </argument>
    </argumentList>
</action>
<action>
    <name>LinkOnPacketSend</name>
    <argumentList><argument>
        <name>phyId</name><direction>in</direction>
        <relatedStateVariable>phyId</relatedStateVariable>
    </argument></argumentList>
</action>
<serviceStateTable xmlns="">
    <stateVariable sendEvents="no">
        <name>nuid</name><dataType>bin.hex</dataType>
    </stateVariable>
    <stateVariable sendEvents="no">
        <name>asyncRequest</name><dataType>bin.hex</dataType>
    </stateVariable>
    <stateVariable sendEvents="no">
        <name>asyncResponse</name><dataType>bin.hex</dataType>
    </stateVariable>
    <stateVariable sendEvents="no">
        <name>phyId</name><dataType>i1</dataType>
```

INFORMATION PROCESSING APPARATUS AND METHOD FOR RECEIVING/TRANSMITTING DATA BETWEEN AN IEEE802-BASED FORMAT AND AN IEEE1394-BASED FORMAT

BACKGROUND OF THE INVENTION

1. Field of the Invention

The present invention relates to information processor and method, recording medium and program, and particularly to information processor and method, recording medium and program with which equipment connected to one of a first network based on IEEE802 and a second network based on IEEE1394 can identify another equipment connected to the other network.

2. Description of the Related Art

Recently, a network using IEEE (Institute of Electrical and Electronics Engineers) 1394 high-speed serial bus (hereinafter merely referred to as "IEEE1394 network") has become popular. By connecting audio equipment or video equipment to the IEEE1394 network, each equipment can control the other equipment by using AV/C commands.

Further, an IEEE802 network has become popular. The IEEE802 network is a network that is mainly used to mutually connect personal computers to each other, and each personal computer can control other personal computers on the basis of UPnP (Universal Plug and Play) protocol.

However, the IEEE1394 network and the IEEE802 network are independent on each other, and thus there is a problem that an equipment connected to the IEEE1394 network (hereinafter referred to as "1394 equipment") cannot identify another equipment connected to the IEEE802 network (hereinafter referred to as "UPnP device").

SUMMARY OF THE INVENTION

The present invention has been implemented in view of the foregoing situation, and has an object to enable the 1394 equipment to identify an UPnP device.

In order to achieve the above object, according to a first aspect of the present invention, there is provided an information processor characterized by comprising: plural input means for inputting a first packet from a first network; converting means for converting the first packet input from any input means of the plural input means to a second packet of a second network; plural output means for outputting the second packet converted in the converting means to the second network from any output means of the plural output means; and storage means for storing the association relationship between each of the plural input means and each of the plural output means, the respective input and output means concerned inputting/outputting the corresponding packet.

According to a second aspect of the present invention, there is provided an information processing method characterized by comprising the steps of: managing plural input plugs for inputting a first packet from a first network; managing plural output plugs for outputting a second packet to a second network; converting the first packet input from any input plug of the plural input plugs to the second packet of the second network; outputting the second packet thus converted from any output plug of the plural output plugs to the second network; and storing the association relationship between each of the plural input plugs and each of the plural output plugs, the respective input and output plugs concerned inputting/outputting the corresponding packet.

According to a third aspect of the present invention, there is provided a program of a recording medium for an information processor for performing data communications between a first network in which communications are performed by using a first packet of an IEEE802-based format and a second network in which communications are performed by using a second packet of an IEEE1394-based format, characterized in that the recording medium stores therein a program for executing the steps of: managing plural input plugs for inputting the first packet from the first network; managing plural output plugs for outputting the second packet to the second network; converting the first packet input from any input plug of the plural input plugs to the second packet of the second network; outputting the second packet thus converted from any output plug of the plural output plugs to the second network; and storing the association relationship between each of the plural input plugs and each of the plural output plugs, the respective input and output plugs concerned inputting/outputting the corresponding packet.

According to a fourth aspect of the present invention, there is provided a program for a computer for controlling an information processor for performing data communications between a first network in which communications are performed by using a first packet of an IEEE802-based format and a second network in which communications are performed by using a second packet of an IEEE1394-based format, characterized in that the program makes the computer execute the steps of: managing plural input plugs for inputting the first packet from the first network; managing plural output plugs for outputting the second packet to the second network; converting the first packet input from any input plug of the plural input plugs to the second packet of the second network; outputting the second packet thus converted from any output plug of the plural output plugs to the second network; and storing the association relationship between each of the plural input plugs and each of the plural output plugs, the respective input and output plugs concerned inputting/outputting the corresponding packet.

In the information processor and method, the storage medium and the program according to the present invention, the association relationship between the plural input means or input plugs and the plural output means or output plugs is stored.

BRIEF DESCRIPTION OF THE DRAWINGS

FIG. 8 is a diagram showing the construction of a message output in step S3 of FIG. 7;

FIG. 11 is a diagram showing an example of a message output through the processing of step S26 of FIG. 7;

FIG. 12 is a diagram showing an example of a message output through the processing of step S7 of FIG. 7;

FIG. 13 is a diagram showing an example of a correspondence table held by a node service of FIG. 3;

FIG. 15 is a diagram showing the construction of a packet output through the processing of step S47 of FIG. 7;

FIG. 16 is a diagram showing the construction of a packet output through the processing of step S48 of FIG. 7;

FIG. 18 is a diagram showing the construction of 1394 Proxy Service Description owned by 1394 proxy service of FIG. 3;

FIG. 19 is a diagram showing the construction of 1394 Proxy Service Description owned by 1394 proxy service of FIG. 3;

FIG. 20 is a diagram showing the construction of 1394 Nodes Service Description owned by 1394 nodes service of FIG. 3;

FIG. 21 is a diagram showing the construction of 1394 Nodes Service Description owned by 1394 nodes service of FIG. 3;

FIG. 22 is a diagram showing the construction of 1394 Nodes Service Description owned by 1394 nodes service of FIG. 3.

DETAILED DESCRIPTION OF THE PREFERRED EMBODIMENTS

Preferred embodiments according to the present invention will be described with reference to the accompanying drawings.

Figure 1:
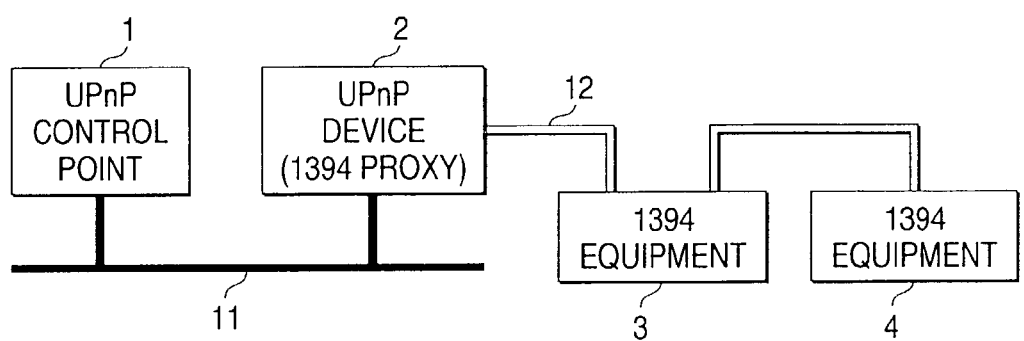
FIG. 1 is a diagram showing the construction of a network system to which the present invention is applied.

FIG. 1 shows the construction of a network system to which the present invention is applied.

In the construction shown in FIG. 1, an UPnP control point 1 is connected to an IEEE802 network 11. 1394 equipments 3, 4 are connected to an IEEE1394 network 12. The IEEE802 network 11 and the IEEE1394 network 12 are respectively connected to the UPnP device (1394 proxy) 2.

Figure 2:
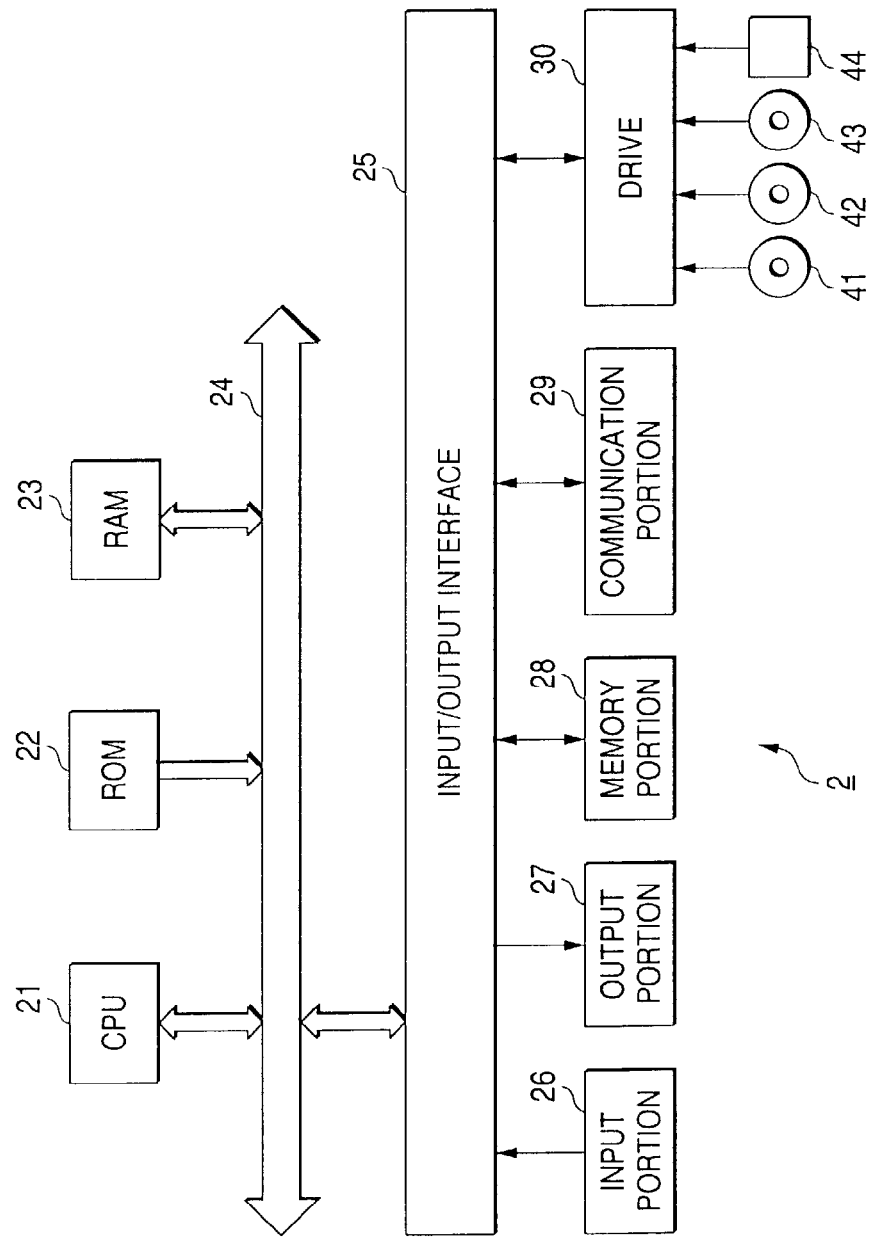
FIG. 2 is a block diagram showing the construction of UPnP device 2 shown in FIG. 1.

FIG. 2 shows an example of the construction of the UPnP device 2.

In FIG. 2, CPU (Central Processing Unit) 21 executes various kinds of processing according to a program stored in ROM (Read Only Memory) 22 or a program loaded from a storage portion 28 into RAM (Random Access Memory) 23. In RAM 23 are also stored data required when CPU 21 executes various kinds of processing, if necessary.

CPU 21, ROM 22 and RAM 23 are mutually connected to one another through a bus 24. An input/output interface 25 is also connected to the bus 24.

To the input/output interface 25 are connected an input portion 26 comprising a keyboard, a mouse or the like, a display such as CRT or LCD, an output portion 27 such as a speaker, a storage portion 28 comprising a hard disc or the like, and a communication portion 29 such as a modem, or a terminal adapter. The communication portion 29 carries out the communication processing through the IEEE802 network 11 or the IEEE1394 network 12.

Further, a drive 30 is connected to the input/output interface 25 as occasion demands, a magnetic disc 41, an optical disc 42, a magneto-optical disc 43, a semiconductor memory 44 or the like is mounted if necessary, and a computer program read out therefrom is installed into the storage portion 28 as occasion demands.

The UPnP device (in the case of FIG. 1, the UPnP control point 1 and the UPnP device 2) mainly has the following six functions: Addressing, Discovery, Description, Control, Eventing and Presentation.

Addressing is a function with which each UPnP device achieves an address on the IEEE 802 network 11, and DHCP (Dynamic Host Configuration Protocol) or AutoIP is used.

Discovery is carried out after Addressing, and it enables the UPnP control point 1 to find out target equipment which the UPnP control point 1 wishes to control. A protocol used here is SSDP (Simple Service Discovery Protocol). When each equipment is connected to the IEEE802 network 11, it multicasts a message indicating devices installed therein and services onto the IEEE802 network 11 (particularly, packets are transmitted without specifying any communication partner). The UPnP control point 1 receives the message thus multicasted to know which equipment is connected to the IEEE802 network 11 (i.e., identify the equipment connected to the IEEE802 network 11.

Conversely, an equipment connected to the IEEE802 network 11 at present can be investigated from the side of the UPnP control point 1. At this time, the UPnP control point 1 multicasts a search command onto the IEEE802 network 11 by using a device or service to be discovered as a keyword. When the condition prescribed in the search command thus multicasted is met, each equipment connected to the IEEE802 network 11 unicasts a response to the search command concerned (i.e., specifies the communication partner side and transmits packets thereto), whereby the UPnP control point 1 can detect the equipment connected to the IEEE802 network 11.

Further, when each equipment gets out of the IEEE802 network 11, this is broadcasted in advance.

URL (Uniform Resource Locator) of a device description is described in an SSDP packet output from control target equipment discovered on the basis of Discovery by the UPnP control point 1. The UPnP control point 1 accesses the URL to achieve more detailed device information on the equipment from the device description. The device information contains icon information, model name, producer name, article name, etc.

In the device information is described information on a service to be provided by the device concerned. The service description in which the detailed information of the service is described can be searched on the basis of URL described in the service information.

The UPnP control point 1 can know a method of accessing the target on the basis of the device information (Device Description) and the service information (Service Description).

Further, Presentation URL described later is also described in the device description.

The Device Description and the Service Description are represented by XML (Extensible Markup Language).

Control is mainly classified into Action and Query. Action is performed by a method prescribed in the action information of the Service Description, and the UPnP control point 1 can operate the target by invoking Action.

Query is used to pick up the value of stateVariable of the Service Description. The value of stateVariable represents the state of the equipment.

A transport protocol called as SOAP (Simple Object Access Protocol) is used in Control. XML is used as the expression language thereof.

When the value of stateVariable is changed, Eventing is used to notify the fact of the change from the target to the UPnP control point 1. The UPnP control point 1 can know variables held by the target from stateVariable by analyzing the Service Description. With respect to variables for which sendEvents is set to yes, when these variables are changed, the UPnP control point 1 can receive a notification on the change from the target by outputting Subscription to the target in advance. A transport protocol called as GENA (General Event Notification Architecture) is used for Eventing. XML is used as the expression language thereof.

Presentation is used to supply a user with control means using a user interface (UI). Presentation Page described with HTML (Hyper Text Markup Language) can be achieved by accessing Presentation URL described in Device Description. By using this function, an application can be prepared at the target.

Figure 3:
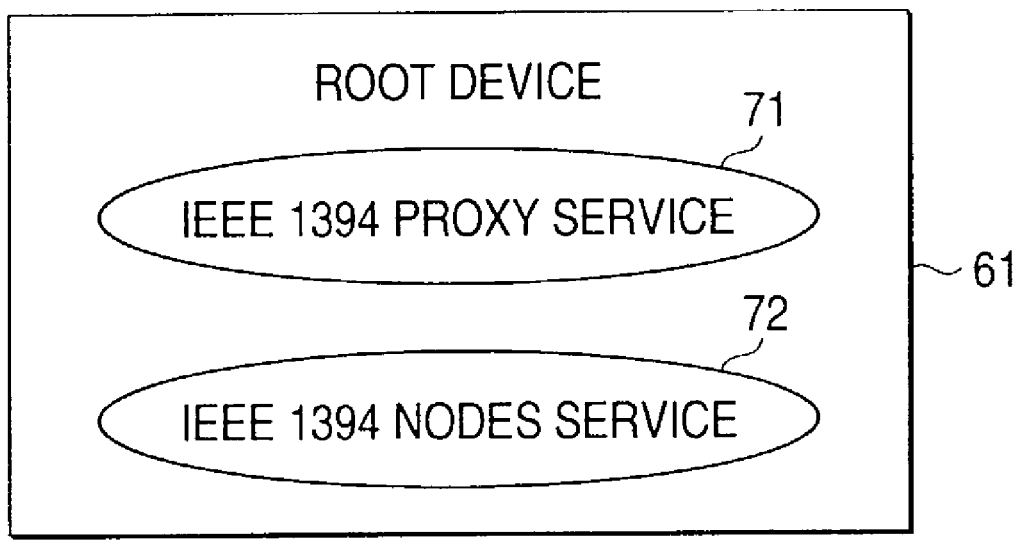
FIG. 3 is a diagram showing the construction of a device model which the UPnP device 2 of FIG. 1 has.

The UPnP device (1394 proxy) 2 functions as a bridge between the IEEE802 network 11 and the IEEE1394 network 12, and it has a device model shown in FIG. 3. The device model is constructed by one root device 61, and the root device 61 has an IEEE1394 proxy service 71 and an IEEE1394 nodes service 72.

The IEEE1394 proxy service (hereinafter merely referred to proxy service) 71 manages occurrence of bus reset of the IEEE1394 network 12, bus ID, the number of nodes, bus manager, node unique ID of isochronous resource manager (NUID), Gap Count, Self ID packet, etc.

The IEEE1394 nodes service (hereinafter merely referred to "node service") 72 receives/transmits Link-On packets, phy packets containing Phy Configuration packets, etc., asynchronous packets and isochronous packets.

Figure 4:
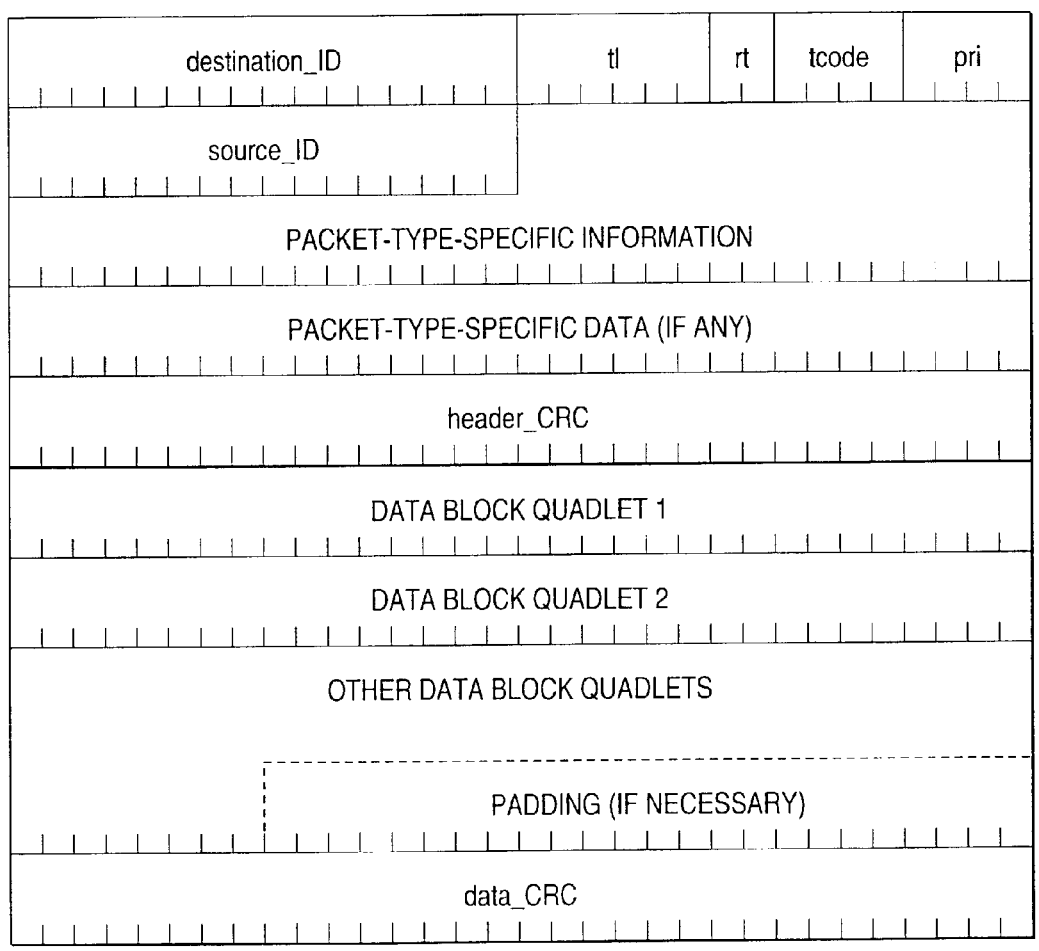
FIG. 4 is a diagram showing the construction of asynchronous packet.

FIG. 4 shows the construction of the asynchronous packet.

Asynchronous communication is used when data communications are carried out asynchronously. In the asynchronous communications, it is guaranteed that packets are surely transmitted to a communication partner node, and no delay time of the transmission is guaranteed. The transmission node transmits header information and actual data to a node which is an indicated partner, and a reception node returns an Acknowledge packet to thereby notify reception of the packet to the communication partner. However, when a broadcast packet indicating no communication-partner node is received, the reception node returns no Acknowledge packet.

Destination_ID (Destination identifier) is disposed at the head of the 1394 packet header. This represents node_ID of the packet transmission destination.

"tl" (Transaction label) is a label for recognizing the coincidence between a pair of transactions of a request packet and a response packet. tl of the request packet is also used as tl of the response packet.

"rt" (Retry code) represents information on a retry method when busy Acknowledge is received.

"tcode" (Transaction code) represents a type code of a transaction packet. That is, it represents one of read/write/lock or request/response.

"pri" (Priority) is set to a110 (excluding cycle start at fair arbitration.

"source_ID" (Source identifier) represents the node_ID of a packet transmission origin.

"packet-type-specific information" is disposed subsequently to source_ID, and if necessary, "packet-type-specific data" are further disposed. CRC corresponding to the above header information is inserted as header_CRC at the last of the 1394 packet header.

A data block is disposed subsequently to the 1394 packet header. The data block comprises a required number of data block quadlets, and data_CRC as CRC for data information.

Figure 5:
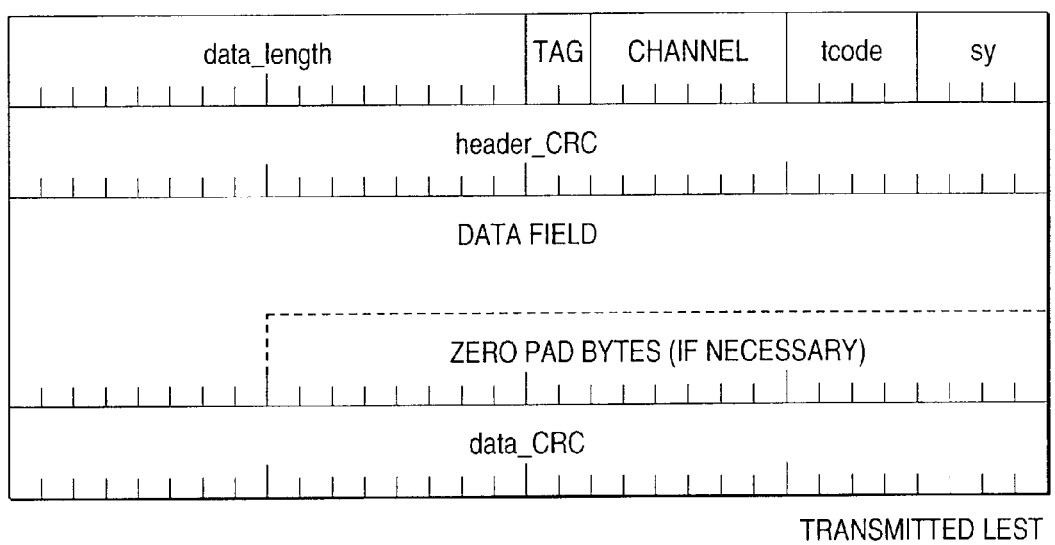
FIG. 5 is a diagram showing the construction of isochronous packet.

FIG. 5 represents the structure of the Isochronous packet. Data_length prescribes the byte value of a data field subsequent to the header. If this value is equal to zero, it represents that there is no data field.

"tag" (isochronous data format tag) represents the format of the Isochronous packet.

"channel" represents a channel number used to identify the Isochronous packet. "tcode" (transaction code) represents a code indicating the type of the packet. Isochronous packet is set to Ah.

"sy" (synchronization code) is used to communicate synchronous information such as pictures and sounds between a transmission node and a reception node.

"data field" (data block payload) represents Isochronous data.

Figure 6:
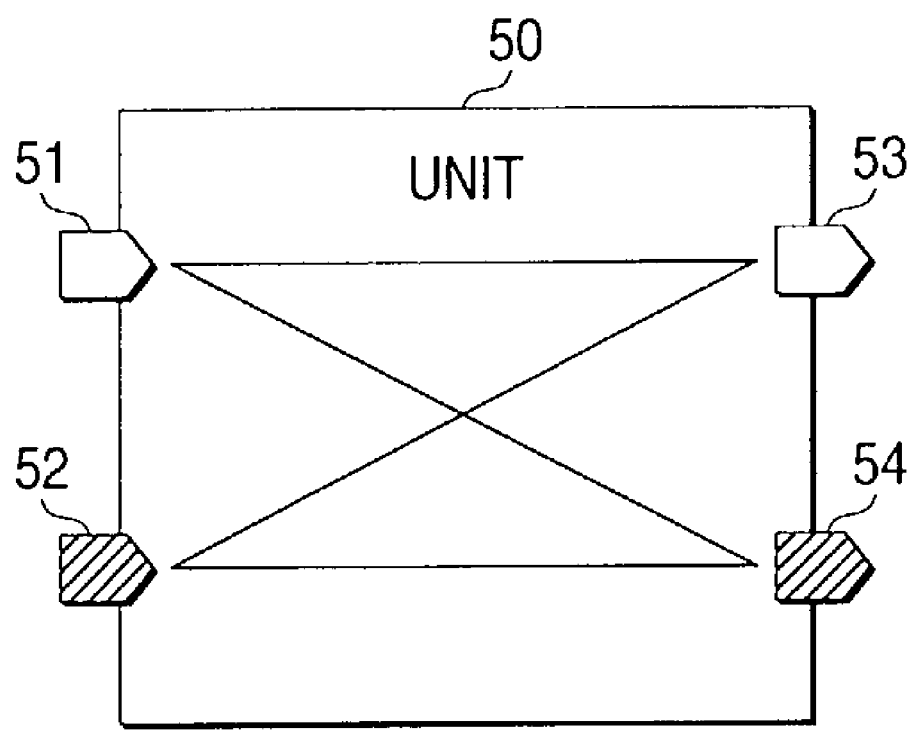
FIG. 6 is a diagram showing the construction of an AV/C device model that 1394 proxy service of FIG. 3 has.

FIG. 6 shows the construction of an AV/C device model that the proxy service 71 has. The AV/C device model 50 has an isochronous input plug 51 and a general bus input plug 52 as input plugs, and also it has an isochronous output plug 53 and a general bus output plug 54 as output plugs. Plugs having numbers of 00h to 1Eh can be provided as the isochronous input plug 51, and plugs having numbers of 40h to 5Eh can be provided as the general bus input plug 52. Further, plugs having numbers of 00h to 1Eh can be provided as the isochronous output plug 53, and plugs having numbers of 40h to 5Eh can be provided as the general bus output plug 54.

An isochronous packet is input to the isochronous input plug 51. Packets other than the isochronous packet (for example, packets in the IEEE802 network 11) are input to the general bus input plug 52.

The isochronous output plug 53 outputs an isochronous packet, the general bus output plug 54 outputs other packets (for example, packets of the IEEE802 network 11).

The AV/C device model 50 basically outputs from the isochronous output plug 53 the data input from the isochronous input plug 51, and also outputs from the general bus output plug 54 the data input from the general bus input plug 52. However, if necessary, it can switch the input and the output to each other to output from the isochronous input plug 54 the data input from the isochronous input plug 51 and also output from the isochronous output plug 53 the data input from the general input plug 52.

Next, the processing carried out when the UPnP control point 1 connected to the IEEE802 network 11 controls equipment connected to the IEEE1394 network 12 will be described with reference to the flowchart of FIG. 7.

In step S1, the UPnP control point 1 subscribes the proxy service 71 constituting the 1394 proxy device 2 so that when some variation is made in the IEEE1394 network 12, the proxy service 71 notifies this variation to the UPnP control point 1. Instep S11, when receiving this Subscribe, the proxy service 71 executes the processing corresponding to the subscribe.

For example, if 1394 equipment 3 is connected to the IEEE1394 network 12 in step S41, in step S42 bus reset occurs in the 1394 equipment 3, and likewise, in step S21 bus reset occurs in the node service 72 of the root device 61.

At this time, the node service 72 notifies the occurrence of the bus reset to the proxy service 71 in step S22.

When detecting a notification from the node service 72 instep S12, on the basis of the Subscribe from the UPnP control point 1 taken in step S11, the proxy service 71 notifies to the UPnP control point 1 that the 1394 equipment 3 is connected to the IEEE1394 network 12 in step S13.

In step S2, the UPnP control point 1 receives a notification from the proxy service 71, whereby the UPnP control point 1 can know that the 1394 equipment 3 is connected to the IEEE1394 network 12.

Therefore, in step S3, the UPnP control point 1 invokes the request packet of Action based on SOAP corresponding to asynchronous read request command to read out information recorded at a predetermined address of the register of the 1394 equipment 3, for example.

FIG. 8 shows an example of a request message transmitted from the UPnP control point 1 to the node service 72. The UPnP control point 1 refers to 1394 Nodes Service Description shown in FIGS. 20 to 23 described later to create a request message.

Since a response is returned in connection with a request, the numeral "5" contained in Transaction represents a transaction level as a label to recognize which request the response corresponds to.

"nuid" contained in Body represents the node unique ID (NUID) of the communication partner of this message. In the case of this example, it represents NUID of the 1394 equipment 3. NUID "0800460000000000" is described in the notification achieved from the proxy service 71 through the processing of step S2. This NUID is converted to the node ID of the 1394 equipment 3 (in the case of FIG. 9, "ffc0") on the basis of the corresponding table that the node service 72 has, and stored in destination_ID of the packet of FIG. 9.

"command" represents the type of a command with which the UPnP control point 1 requests "occurrence" to the node service 72. That is, in this example, occurrence of asynchronous read request command is requested.

Figure 9:
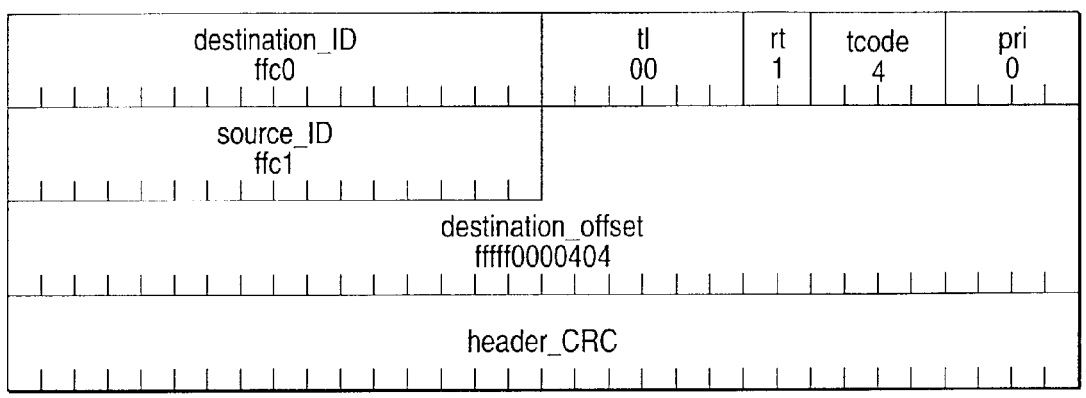
FIG. 9 is a diagram showing the construction of a packet output through the processing of step S24 of FIG. 7.

"000001400000" (hexadecimal number) at MSB side which is contained in "command" represents a transaction label tl, a retry code rt, a transaction code tcode and a priority Pri of FIG. 9 in read request for data quadlet packet shown in FIG. 9 which is generated by the node service 72.

"ffff0000404" at LSB side corresponds to destination_offset in FIG. 9. That is, this value represents the address of the register of the 1394 equipment 3 which the UPnP control point 1 wishes to read.

The node ID of the node service 72 (in the case of the example of FIG. 9, "ffc1") is described in the source_ID field of FIG. 9.

All these values are represented in the text style, and thus they can be described in any kind of packet of the IEEE1394.

Returning to FIG. 7, when receiving Invoke of Action shown in FIG. 8 in step S23, the node service 72 creates a packet of asynchronous read request shown in FIG. 9 in connection with Invoke of Action in step S24, and transmits it through the IEEE1394 network 12 to the 1394 equipment 3. At this time, the node service 72 stores the corresponding table representing the association relationship between the request shown in FIG. 8 and the request packet shown in FIG. 9.

When receiving the asynchronous read request packet transmitted from the node device 72 in step S43, the 1394 equipment 3 executes the processing corresponding to the request (in this case, read-out of the register). In step S44, the 1394 equipment 3 creates a response packet as shown in FIG. 10 which corresponds to the request packet, and transmits it to the node service 72.

Figure 10:
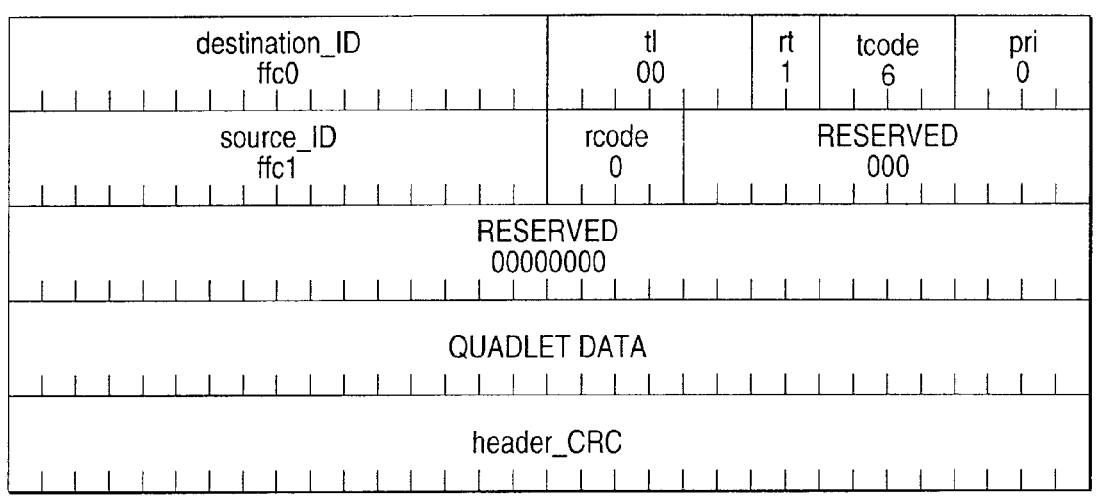
FIG. 10 is a diagram showing the construction of a packet output through the processing of step S44 of FIG. 7.

As shown in FIG. 10, the value of the transaction code tcode is set to the value "6" representing "response".

The values in the read request for data quadlet packet of FIG. 9 are directly used as the values of destination_ID and source_ID. The data read out from the address of destination_offset are disposed in quadlet data.

When receiving the response packet transmitted from the 1394 equipment 3 in step S25, the node service 72 creates Response as Action based on the SOAP protocol as shown in FIG. 11 in step S26, and transmits it to the UPnP control point 1.

On the basis of the corresponding table, the value "5" indicated in Transaction shown in FIG. 11 is set to "5" (the same value) in connection with the value "5" of Transaction in FIG. 8 in order to indicate that it is Action paired with Action of FIG. 8.

In Body of FIG. 11 is described "Response" so that it corresponds to the asynchronous read response of 1394. Further, data of "0000016000000000000000031333934" is described there. This data is the value described in the quadlet data of FIG. 10, and it is read out from the offset address of the 1394 equipment 3. In step S4, the UPnP control point 1 reads out this value.

In this example, in step S5 the UPnP control point 1 subsequently invokes the request packet of Action based on SOAP in which a command to control a predetermined operation of the 1394 equipment 3 (in this case, the turn on the power of the 1394 equipment 3) is described.

The UPnP control point 1 refers to the 1394 Nodes Service Description shown in FIGS. 20 to 23 described later that the node service 7 has, and creates this message (command).

When receiving Invoke of Action in step S27, the node service 72 creates the AV/C command (AV/C power control command) in connection with the Invoke of Action in step S28, and transmits it through the IEEE1394 network 12 to the 1394 equipment 3.

The AV/C node service 72 creates and holds the corresponding table between NUID and Node ID, and renews them every time bus reset occurs. NUID is converted to the node ID on the basis of the corresponding table, and transmitted to the IEEE1394 network 12.

When receiving the AV/C power control command transmitted from the node device 72 in step S45, the 1394 equipment 3 turns on the power of the device in connection with the content of the command. Thereafter, instep S46 the 1394 equipment 3 creates the corresponding AV/C response (AV/C POWER response) and transmits it to the node service 72.

When receiving the AV/C POWER response transmitted from the 1394 equipment 3 in step S29, the node service 72 creates Response as Action based on the SOAP protocol in step S30, and transmits it to the UPnP control point 1.

The node service 72 creates and holds a table for holding the association relationship of Transaction (corresponding table). That is, when the AV/C POWER control command is received in step S27 and when the AV/C POWER control command is output in step S28, it is stored in the table that both are associated with each other. Accordingly, when the AV/C POWER response is transmitted from the 1394 equipment 3, the node service 72 can recognize that it is the response corresponding to the AV/C POWER control command by referring to this table.

When receiving the AV/C POWER response in step S29, the node service 72 creates Response of Action based on SOAP in step S30, and transmits it to the UPnP control 1.

The UPnP control point 1 receives this response in step S6, whereby the UPnP control point 1 can know that the 1394 equipment 3 turns on the power of the device.

According to the prescription of AV/C, it is prescribed that when AV/C equipment cannot immediately execute the processing corresponding to a request received, it returns INTERIM as a response. Thereafter, when the processing corresponding to the request is completed, the AV/C equipment returns the final response to the transmitter of the request at that time point.

However, there is no prescription on the time from the reception of the request until the return of the final response. Therefore, the node service 72 manages the time until it receives the AV/C response from the 1394 equipment 3 in the processing of the step S29 after the AV/C command is output to the 1394 equipment 3 in the processing of the step S28. When a response is received within a predetermined time set in advance (for example, 30 seconds), the AV/C node service 72 immediately transmits the response corresponding to the response received to the UPnP control point 1 if the response is not INTERIM (in the case of the final response).

On the other hand, if the response received is INTERIM, the AV/C node service 72 is on standby until 30 seconds elapse from the transmission of the AV/C command. When a response other than INTERIM (final response) is received before 30 seconds elapse, the response corresponding to the final response is output. If no final response is received within 30 seconds, the AV/C node service 72 outputs INTERIM as the response, whereby the UPnP control point 1 can know whether the processing requested at least within 30 seconds can be completed or not.

Figure 7:
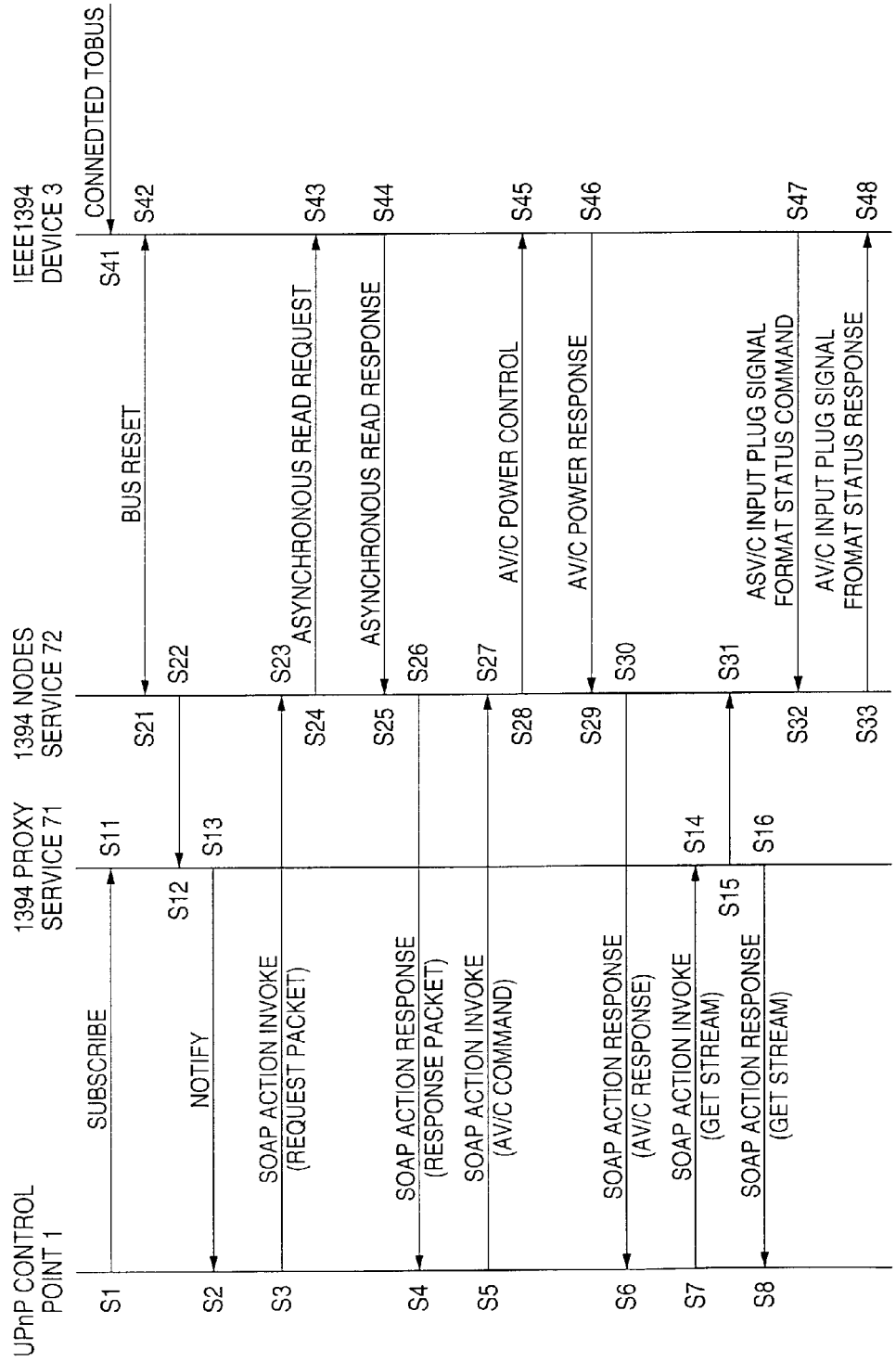
FIG. 7 is a flowchart showing the processing of the network system of FIG. 1.

In the example of FIG. 7, the UPnP control point 1 invokes "get Stream" of Action based on SOAP in step S7.

FIG. 12 shows an example of a message to be created and output in this case.

"5" represents a transaction label, and "getStream xmlns" represents an action name. "protocol" indicates a protocol used to transmit a stream on IP. "uri" indicates a file on IP which flows in the style of "isochronous".

When receiving Invoke of get Stream from the UPnP control point 1 in step S14, the proxy service 71 executes the processing of achieving a stream flowing through the IEEE802 network 11 in connection with the Invoke thus received in step S15. At this time, the proxy service 71 is assumed to input the stream to the general bus input plug 52 of the AV/C device model 50. When this stream flows into the IEEE1394 network 12, the proxy service 71 carries out the conversion processing of the format of the packet, and also connects the general bus input plug 52 to the isochronous output plug 53.

Further, it requests the node service 72 to transmit the packet to the IEEE1394 network 12. The node service 72 executes the processing based on this request in step S31.

As described above, the connection relationship between the input plug and the output plug is stored (reflected) in a built-in memory.

That is, through this processing, the association relation indicating which plug of the plural input plugs is connected to which plug of the plural output plugs is stored. Accordingly, by referring to this memory (table), the 1394 equipment 3 can known the UPnP device connected to the IEEE802 network 11.

FIG. 13 shows an example of the table stored in the node service 72. In this case, the node service 72 has totally four plugs (1 to 4). Of these plugs, the plug 1 is used as the general bus input plug 52 of the number (ID) 40, and the plug 4 is used as the general bus input plug 52 of the number (ID) 41. Data of MEPG format are input to the former plug, and data of Audio format are input to the latter plug.

In step S16, the proxy service 71 creates Response of get Stream as Action corresponding to Action received in step S14, and outputs it to the UPnP control point 1. The UPnP control point 1 receives it in step S8.

Figure 14:
FIG. 14 is a diagram showing an example of a message output through the processing of step S16 of FIG. 7.

FIG. 14 shows an example of a message in this case. "5" of the transaction label corresponds to the transaction label of FIG. 12.

In the case of FIG. 7, the 1394 equipment 3 further outputs AV/C Input Plug Signal Format Status Command to the node service 72 in step S47. This command requests a notification of the equipment connected to the input plug in the AV/C device model 50.

FIG. 15 shows the format of the command. In Opcode is described a value 19h representing that this command is INPUT PLUG SIGNAL FORMAT.

One number for specifying the input plug is described in the plug field.

When receiving the command from the 1394 equipment 3 in step S32, the node service 72 executes the processing corresponding to this command in step S33. That is, the equipment connected to the input plug indicated is read out, and it is output as AV/C Input Plug Signal Format Status Response to the 1394 equipment 3. In step S48, the 1394 equipment 3 receives this Response and reads the content thereof, so that it can know the UPnP device connected to the IEEE802 network 11.

FIG. 16 shows the format of Response in this case. The format is set to the same format as INPUT PLUG SIGNAL FORMAT control command format.

In the case of Audio, "010000" is described in an fmt field, and in the case of MEPG 2 of video, "100000" is described in the fmt field.

The value described in the plug field of the command format of FIG. 15 is directly described in the plug field.

The time for which the plug is connected is described in an fdf field.

Figure 17:
FIG. 17 is a diagram showing the construction of 1394 Proxy Device Description owned by a root device of FIG. 3.
Figure 23:
FIG. 23 is a diagram showing the construction of 1394 Nodes Service Description owned by 1394 nodes service of FIG. 3.

In order to execute the above processing, the root device 61 of the device model owned by the 1394 proxy 2 shown in FIG. 3 has 1394 Proxy Device Description shown in FIG. 17, the proxy service 71 has 1394 Proxy Service Description shown in FIGS. 18 and 19, and the node service 72 has 1394 Nodes Service Description shown in FIGS. 20 to 23.

In these Descriptions are described parameters required to execute the functions of the equipment concerned and other conditions. When another equipment requests the equipment concerned to execute the function thereof, by referring the Description thereof, the equipment adds the condition described therein and transmits it to the equipment concerned.

In FIG. 17, deviceType "urn:sonycorp:device:1394Proxy-Device:1" represents that the device type is Proxy Device. FriendlyName "proxy for IEEE1394" represents the friendly name of the root device 61.

UDN"nuid:upnp-1394proxy-root-0800460000000000" represents the inherent number of the root device 61.

Two services are described in this Device Description. One is a service the serviceType of which is "urn:sonycorp:service:1394ProxyService:1" and the other is a service the serviceType of which is "urn:sonycorp:service:1394Node-Service:1". That is, the former is the service corresponding to the proxy service 71 of FIG. 3, and the latter is the service corresponding to the node service 72 of FIG. 3.

SCPDURL "./scpd/proxyScpd.xml" of the former service represents URL of Proxy Service Description owned by the proxy service 71 (specifically, URL of Proxy Service Description shown in FIGS. 18 and 19).

SCPDURL "./scpd-nodeScopd.xml" of the latter service represents URL of Nodes Service Description owned by the node service 72 (specifically, 1394 Nodes Service Description shown in FIGS. 20 to 23).

Action in 1394 Proxy Service Description of FIGS. 18 and 19 represents various kinds of actions, and the action having the name "busRest" represents an action for inducing bus reset. The action having the name "getNodeNum" represents an action to achieve the number of nodes on the 1394 bus. The action having the name "getIrmId" represents an action to achieve NUID of IRM (Isochronous Resource Manager) on the 1394 bus.

The action having the name "getBmId" represents an action to achieve NUID of the bus manager on the 1394 bus. The action having the name "getGapCount" represents an action to achieve Gap Count on the 1394 bus.

The action having the name "getselfIdPacket" represents an action to achieve SelfID packet flowing on the 1394 bus.

An argument in which the direction having the name "nodeNum" is "out" (the argument output and transmitted from another equipment) is prescribed in the action having the name "getNodeNum". In the argument "nodeNum", the relating prescription is described in serviceStateTable. That is, it is described in "nodeNum" that when an event is generated in subscribed equipment or a status variable is varied, it is an argument that is output while it has the data form of "i1".

An argument in which "direction" having the name "nuid" is "out" is prescribed in the action of "getIrmId". An argument in which "direction" having the name "getcount" is "out" is prescribed in the action of "getGapCount", and an argument in which "direction" having the name "selfId-Packet" is "out" is prescribed in the action having the name "getSelfIdPacket". These arguments transmit no notification to even the subscribed equipment even when the status variable is varied, and it is described that they are output from each equipment while the form of the data is "bin.hex".

In 1394 Nodes Service Description shown in FIGS. 20 to 23 are prescribed the actions of "asyncReqSend", "avcCommandSend", "phyPacketSend" and "LinkOnPacketSend".

The action having the name "asyncReqSend" represents an action to transmit an asynchronous packet. On the basis of this action, the action shown in FIGS. 8 and 11 is created.

In this action is prescribed an argument in which "direction" having the name "nuid" is "in" (an argument output to and input into another equipment). The data type of this argument "nuid" is set to "bin.hex".

In the action of "asyncReqSend" are further prescribed an argument in which direction of "asyncRequest" is "in" and an argument in which direction of "asynchResponse" is "out".

Likewise, an argument in which direction having the name "asyncRequest" is "in" and an argument in which direction having the name "asyncResponse" is "out" are prescribed as having the date form of "bin.hex".

The action having the name "avcCommandSend" represents an action to transmit the AV/C command, thereby creating the action based on the processing of the steps S5 and S30 of FIG. 7.

The action having the name "phyPacketSend" represents an action to transmit a phy packet. In this command, an argument in which direction having the name "phypacket" is "in" and an argument in which direction having the name "phyPacketResp" is "out" are prescribed, these arguments have the relating variables "phypacket" and the data type is "ui4".

The action having the name "LinkOnPacketSend" represents an action to transmit LinkOn packet. This action has an argument in which direction of "phyid" is "in". The data type of this argument is "i1".

The series of processing described above can be executed by hardware, however, they may be executed by software. When the series of processing is executed by software, the program constituting the software is installed into a computer incorporated in a dedicated-purpose hardware or installed from a network or recording medium into a general personal computer which can execute various kinds of functions by installing various programs or the like.

As shown in FIG. 2, the recording medium is constructed not only by a package medium such as a magnetic disc 41 (containing a floppy disk), optical disc 42 (containing CD-ROM (Compact Disk-Read Only Memory), DVD (Digital Versatile Disk)), magneto-optical disc 43 (containing MD (Mini-Disk)) or semiconductor memory 44, which is distributed to users to supply programs separately from the main body of an apparatus and in which the programs are recorded, but also by ROM 22 which is supplied to users while it is installed in the main body of an apparatus in advance and in which the programs are recorded, a hard disc contained in the storage portion 28 or the like.

In this specification, the step of describing the program to be recorded in the recording medium may contain not only the processing that is time-sequentially carried along the order described, but also the processing that is executed in parallel or individually even without being processed time-sequentially.

Further, in this specification, the system represents the overall apparatus constructed by plural devices.

As described above, according to the information processing apparatus and method of the present invention, the recording medium and the program, the association relationship between the input means or input plug and the output means or output plug is stored, so that equipment connected to a second network can know equipment connected to a first network.

The invention claimed is:

1. An information processing apparatus for receiving/transmitting data between a first network and a second network, communications being carried out in the first network using a first packet of an IEEE802-based format, communications being carried out in the second network using a second packet of an IEEE1394-based isochronous communication format and using a third packet of an IEEE1394-based asynchronous communication format, said processing apparatus comprising:

first input means for inputting the first packet from the first network;

second input means for inputting the second packet from the second network;

third input means for inputting the third packet from the second network;

first converting means for converting the first packet inputted from the first input means into the second packet;

second converting means for converting the first packet inputted from the first input means into the third packet;

third converting means for converting the third packet inputted from the third input means into the first packet;

first output means for outputting the first packet thus converted to the first network;

second output means for outputting the second packet thus converted to the second network;

third output means for outputting the third packet thus converted to the second network;

control means for controlling said first input means, said second input means, said third input means, said first converting means, said second converting means, said third converting means, said first output means, said second output means, and said third output means and for determining association relationships among said first input means, said second input means, said third input means, said first converting means, said second converting means, said third converting means, said first output means, said second output means, and said third output means;

first storage means for storing the association relationships among said first input means, said second input means, said third input means, said first converting means, said second converting means, said third converting means, said first output means, said second output means, and said third output means;

second storage means for storing an identification information mapping table which shows a relationship between unique identification information for an electronic apparatus connected to the second network and identification information for a node in the second network that is assigned to the electronic apparatus; and update means for updating the identification information mapping table stored in said second storage means when a bus reset occurs in the second network.

2. An information processing method for an information processing apparatus for receiving/transmitting data between a first network and a second network, communications being carried out in the first network using a first packet of an IEEE802-based format, communications being carried out in the second network using a second packet of an IEEE1394-based isochronous communication format and using a third packet of an IEEE1394-based asynchronous communication format, said method comprising:

managing a plurality of input plugs for inputting the first packet from the first network, the second packet from the second network, and the third packet from the second network;

converting the first packet input into the second packet, converting the first packet input into the third packet, and converting the third packet input into the first packet;

outputting the first packet thus converted to the first network, outputting the second packet thus converted to the second network, and outputting the third packet thus converted to the second network;

controlling said managing step, said converting steps, and said outputting step;

determining association relationships among said managing step, said converting steps, and said outputting step;

storing the association relationships among said managing step, said converting steps, and said outputting step;

storing an identification information mapping table which shows a relationship between unique identification information for an electronic apparatus connected to the second network and identification information for a node in the second network that is assigned to the electronic apparatus; and updating the identification information mapping table when a bus reset occurs in the second network.

3. A recording medium stored with a computer-readable program for carrying out an information processing method for receiving/transmitting data between a first network and a second network, communications being carried out in the first network using a first packet of an IEEE802-based format, communications being carried out in the second network using a second packet of an IEEE1394-based isochronous communication format and using a third packet of an IEEE1394-based asynchronous communication format, comprising:

managing a plurality of input plugs for inputting the first packet from the first network, the second packet from the second network, and the third packet from the second network;

converting the first packet input into the second packet, converting the first packet input into the third packet, and converting the third packet input into the first packet;

outputting the first packet thus converted to the first network, outputting the second packet thus converted to the second network, and outputting the third packet thus converted to the second network;

controlling said managing step, said converting steps, and said outputting step;

determining association relationships among said managing step, said converting steps, and said outputting step;

storing the association relationships among said managing step, said converting steps, and said outputting step;

storing an identification information mapping table which shows a relationship between unique identification information for an electronic apparatus connected to the second network and identification information for a node in the second network that is assigned to the electronic apparatus; and updating the identification information mapping table when a bus reset occurs in the second network.

4. In an information processing apparatus, a processor that executes a software program for carrying out an information processing method for receiving/transmitting data between a first network and a second network, communications being carried out in the first network using a first packet of an IEEE802-based format, communications being carried out in the second network using a second packet of an IEEE1394-based isochronous communication format and using a third packet of an IEEE1394-based asynchronous communication format, said method comprising:

managing a plurality of input plugs for inputting the first packet from the first network, the second packet from the second network, and the third packet from the second network;

converting the first packet input into the second packet, converting the first packet input into the third packet, and converting the third packet input into the first packet;

outputting the first packet thus converted to the first network, outputting the second packet thus converted to the second network, and outputting the third packet thus converted to the second network;

controlling said managing step, said converting steps, and said outputting step;

determining association relationships among said managing step, said converting steps, and said outputting step;

storing the association relationships among said managing step, said converting steps, and said outputting step;

storing an identification information mapping table which shows a relationship between unique identification information for an electronic apparatus connected to the second network and identification information for a node in the second network that is assigned to the electronic apparatus; and updating the identification information mapping table when a bus reset occurs in the second network.

* * * * *